Patented June 26, 1928.

1,675,265

UNITED STATES PATENT OFFICE.

McKINLEY GANNON, OF SEWARD, NEBRASKA, ASSIGNOR TO GANNON PRODUCTS COMPANY, OF SEWARD, NEBRASKA, A FIRM.

CEMENT.

No Drawing.   Application filed June 29, 1927.   Serial No. 202,462.

My present invention pertains to glues or cements, and is adapted for general use in making and mending, and the like, and it contemplates the provision of inexpensive comingling of ingredients hereinafter specifically referred to.

The composition consists of a mixture of acetone, celluloid, shellac gum, camphor gum, banana oil and denatured alcohol.

In preparing the composition, I prefer to use the ingredients in about the following proportions, to-wit: 5 gallons of acetone, 10 pounds of celluloid, 4 pounds of shellac gum, 2 ounces of camphor gum, 4 ounces of banana oil, and one-half gallon of denatured alcohol. The ingredients are thoroughly mixed, and I find that good results may be obtained by varying the proportions of the ingredients, although the best results are obtained with the proportions of ingredients above outlined.

My composition, when properly compounded, is heat-, as well as water-proof, and is extremely efficient for repairing broken furniture, woodwork, glass, china, earthenware, aluminum, tin, leather goods, celluloid, and numerous other articles, and is well adapted for use for various purposes that may arise.

My method of compounding is, first I take ten pounds of celluloid and five gallons of acetone which I place in a receptacle and mix until the two form a liquid, then I place four pounds of shellac gum and one-half gallon of denatured alcohol in an air-tight container and mix until the two form a liquid, after which it is added to the liquid formed of the celluloid and acetone, then both of these liquids are thoroughly mixed, I then add two ounces of pulverized camphor gum and four ounces of banana oil, all ingredients are now carefully and thoroughly mixed together when the cement is ready for use.

I claim:

A waterproof cement consisting of five gallons acetone, ten pounds celluloid, four pounds shellac gum, one-half gallon denatured alcohol, two ounces pulverized camphor gum and four ounces banana oil.

In testimony whereof I have hereunto set my hand.

McKINLEY GANNON.